O. S. LLOYD.
CHECK VALVE.
APPLICATION FILED NOV. 27, 1907.
919,043.
Patented Apr. 20, 1909.
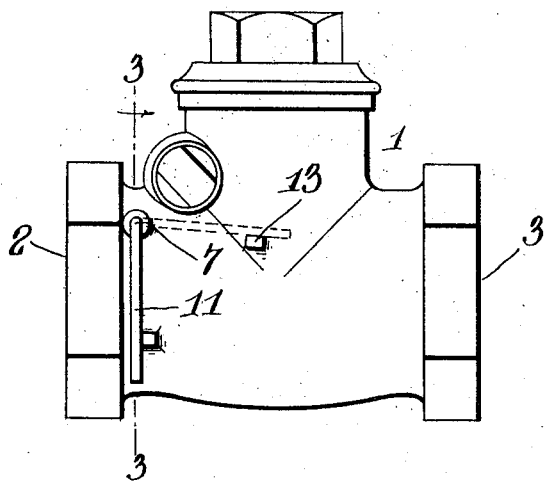
Fig. 1.
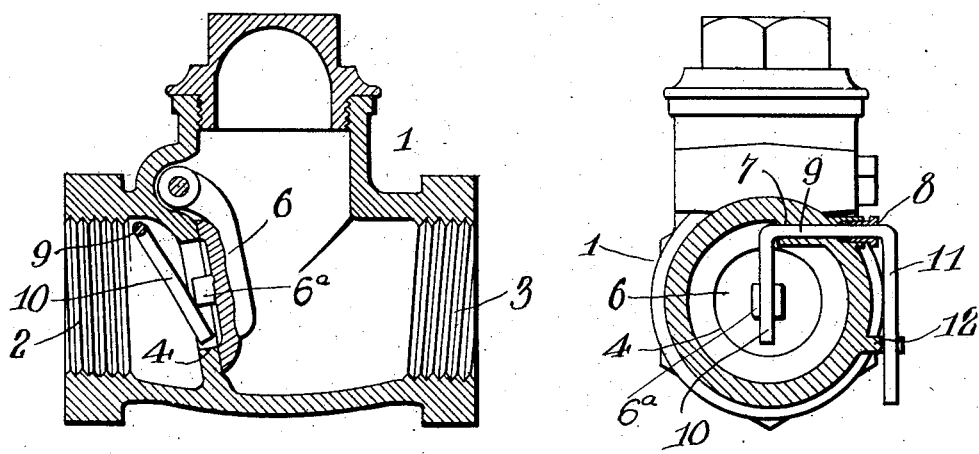
Fig. 2.
Fig. 3.
Witnesses
C. E. Smith.
C. H. Giesbauer.
Inventor
Otis S. Lloyd.
by H. B. Willson & Co.
Attorneys

UNITED STATES PATENT OFFICE.

OTIS S. LLOYD, OF SALISBURY, MARYLAND.

CHECK-VALVE.

No. 919,043.         Specification of Letters Patent.      Patented April 20, 1909.

Application filed November 27, 1907. Serial No. 404,143.

*To all whom it may concern:*

Be it known that I, OTIS S. LLOYD, a citizen of the United States, residing at Salisbury, in the county of Wicomico and State of Maryland, have invented certain new and useful Improvements in Check-Valves; and I do declare the following to be a full, clear, and exact description of the invention, such as will enable others skilled in the art to which it appertains to make and use the same.

In the production of gasolene and analogous engines employed for operating motor boats, motor vehicles and the like, it is highly desirable at certain times, and particularly during freezing weather, to drain the steam and water pipes leading to and from the engines and this in order to avoid freezing of the pipe and the attendant annoyance and inconvenience, this draining of the pipes being best accomplished by opening the check valves controlling the passage of liquid or fluid through the pipes.

This invention relates to check valves and especially to a simple and inexpensive form of device, whereby the valve may be readily and positively opened for the purpose explained, one wherein the valve may be conveniently locked in open position and one in which the valve operating member or lever may, under normal conditions, be fixed against accidental movement.

With these and other objects in view, the invention comprises the novel features of construction and combination of parts more fully hereinafter described.

In the accompanying drawings: Figure 1 is a side elevation of a pipe-connection showing a check valve equipped with an attachment embodying the invention; Fig. 2 is a sectional view taken centrally and longitudinally through the pipe connection; and Fig. 3 is a cross-section taken on the line 3—3 of Fig. 1.

Referring to the drawings, 1 designates a pipe element in the form of a coupling having an inlet 2 and an outlet 3 and provided on its interior at a point near the inlet port with a valve-seat 4 there being pivoted at 5 in the pipe element a check valve 6 herein shown as being of the type known as flap valves and provided on its inner side with a lug, 6ª. These parts which are conventionally shown herein may be of the usual or any appropriate construction and material and are adapted in practice to perform their ordinary functions.

In accordance with the present invention, there is formed through one wall of the pipe element, preferably at a point above and in advance of the valve 6 an opening 7 in which is arranged a stuffing box 8 in which is journaled the horizontal portion of a valve operating member or lever 9, which is by preference, of substantially U-shape in front elevation to present a depending valve engaging portion or arm 10 and a handle portion or arm 11 and of which arm 10 is disposed within the pipe element and the arm 11 at the outer face thereof, there being formed on said outer face a pair of stops or keepers 12 and 13 respectively.

In the operation of the device, the check valve 6 will open automatically in the usual manner under the action of the inflowing liquid or fluid and will under the action of back pressure close automatically against the seat 4, as customary in devices of this kind. At such times as it may be necessary or desirable to drain the pipe, the handle portion 11 of the operating lever is grasped and swung from the full line position, shown in Fig. 1 to the position indicated by dotted lines, whereby the arm 10 will engage the lug, 6ª the valve 6 and move said valve positively to open position, thereby permitting the liquid in the pipe to flow freely in a reverse direction. After the valve has been opened in the manner explained, it may be locked in such position by engaging the arm 11 with the lug or keeper 13, while under normal conditions the lever 9 will be locked against accidental movement through engagement of the arm 11 with the lug or keeper 12, as shown by full lines in Fig. 1.

It is to be particularly noticed that under the improved construction there is provided a simple form of device which may be readily installed for use and through the medium of which the valve may be readily and positively opened and securely locked in open position.

Having described my invention, what I claim, is:

In a device of the class described, a pipe element having a longitudinal channel therethrough, a socket formed in the element above the channel, an apertured inclined wall extending across said channel, a valve pivoted to swing on one side of said wall and to normally rest over the aperture in the wall, a lug on the valve projecting through the aperture, a U-shaped swinging lever pivoted to the pipe element on the opposite side of said wall and adapted to extend through said aperture with one leg in free engagement with the lug and adapted to hold the valve off its seat and in the socket, a lug on the exterior of the pipe element to engage the opposite leg of said lever to lock the valve in raised position, and a lug to hold the lever free of the valve lug.

In testimony whereof I have hereunto set my hand in presence of two subscribing witnesses.

OTIS S. LLOYD.

Witnesses:
  G. V. WHITE,
  CHARLES DASHIELL.